(12) United States Patent
Hung (10) Patent No.: US 9,006,610 B2
(45) Date of Patent: Apr. 14, 2015

(54) TUNGSTEN INERT GAS WELDING TORCH WITH IMPROVED LIQUID COOLING

(75) Inventor: Derek Yu-Fung Hung, Greenville, WI (US)

(73) Assignee: Illinois Tool Works Inc., Glenview, IL (US)

( * ) Notice: Subject to any disclaimer, the term of this patent is extended or adjusted under 35 U.S.C. 154(b) by 606 days.

(21) Appl. No.: 13/323,009

(22) Filed: Dec. 12, 2011

(65) Prior Publication Data

US 2012/0152927 A1    Jun. 21, 2012

Related U.S. Application Data

(60) Provisional application No. 61/423,875, filed on Dec. 16, 2010.

(51) Int. Cl.
| | |
|---|---|
| *B23K 9/12* | (2006.01) |
| *B23K 9/167* | (2006.01) |
| *B23K 9/28* | (2006.01) |
| *B23K 9/29* | (2006.01) |

(52) U.S. Cl.
CPC .............. *B23K 9/167* (2013.01); *B23K 9/285* (2013.01); *B23K 9/291* (2013.01); *B23K 9/296* (2013.01)

(58) Field of Classification Search
CPC ........ B23K 9/167; B23K 9/285; B23K 9/291; B23K 9/296
USPC .............................. 219/137.31–137.7, 121.33
See application file for complete search history.

(56) References Cited

U.S. PATENT DOCUMENTS

| | | | |
|---|---|---|---|
| 6,399,913 B1 | 6/2002 | Sammons et al. | |
| 6,930,281 B2 * | 8/2005 | Delgado | 219/137.62 |
| 7,105,766 B2 * | 9/2006 | Samler | 219/75 |
| 8,552,341 B2 * | 10/2013 | Zamuner | 219/137.31 |

FOREIGN PATENT DOCUMENTS

| | | |
|---|---|---|
| DE | 202006012793 U1 | 10/2006 |
| JP | 53054923 U | 5/1978 |
| JP | 9206947 A | 8/1997 |
| JP | 2002301572 A | 10/2002 |

OTHER PUBLICATIONS

PCT International Search Report & Written Opinion dated May 7, 2012.

* cited by examiner

*Primary Examiner* — Sang Y Paik
(74) *Attorney, Agent, or Firm* — Fletcher Yoder P.C.

(57) ABSTRACT

Systems and methods for improved liquid cooling of a tungsten inert gas (TIG) welding torch are provided. The improved welding torch may feature conduits for conveying coolant from a cooling system to a collar, which holds a tungsten electrode of the welding torch, and back. A coolant return conduit may be disposed in a coolant supply conduit to improve thermal insulation of an outer surface of the welding torch. Some embodiments may feature a helical channel formed in the collar for conveying coolant around the electrode multiple times before returning the coolant through the return conduit.

20 Claims, 5 Drawing Sheets

TUNGSTEN INERT GAS WELDING TORCH WITH IMPROVED LIQUID COOLING

CROSS REFERENCE TO RELATED APPLICATIONS

This application is a Non-Provisional patent application of U.S. Provisional Patent Application No. 61/423,875, entitled "Tungsten Inert Gas Welding Torch with Cold Water Jacket," filed Dec. 16, 2010, which is herein incorporated by reference.

BACKGROUND

The invention relates generally to welding systems, and, more particularly, to liquid cooled tungsten inert gas (TIG) welding torches.

Welding systems generally include an electrode configured to pass an arc between a torch and a work piece, thereby heating the work piece to create a weld. In many systems, such as metal inert gas (MIG) welding and stick welding systems, the electrode is a consumable wire that melts into the weld to provide a filler material into the weld. In contrast, TIG welding systems employ a non-consumable tungsten electrode that is independent from the filler material. That is, the TIG welding process does not melt the tungsten electrode into the weld forming on the work piece. Instead, the tungsten electrode typically heats up over a given period of use. To prevent the heated tungsten electrode from overheating the torch handle, air is generally circulated over the torch handle and liquid may be circulated through a cooling system incorporated into the welding torch.

Liquid cooled TIG torches include a handle leading to a torch head, with one or more conduits in the handle for conveying cooling liquid to and/or from the torch head. Such conduits typically convey the liquid toward the torch head, around the torch head once, and away from the torch head. The temperature at which cooling liquid exits the torch handle is often significantly higher than the temperature at which the liquid enters the torch handle. The hot exiting liquid may limit the amount of current that may be applied to the electrode during welding operations, as a high current may overheat a smaller TIG torch handle through the exiting liquid. Therefore, there exists a need for a TIG welding torch handle that overcomes these deficiencies.

BRIEF DESCRIPTION

In an exemplary embodiment, a welding system includes a welding torch body. The welding system also includes a collar attached to the torch body with a channel formed therein for conveying coolant around an electrode held by the collar. A supply conduit located in the torch body is designed to deliver coolant to the collar, and a return conduit located in the supply conduit is designed to deliver coolant away from the collar. The coolant flowing through the supply conduit may insulate the torch body from the heated coolant flowing through the return conduit.

In another embodiment, a welding system includes a welding torch body. The welding system also includes a collar attached to the torch body and configured to hold an electrode. A supply conduit in the torch body delivers coolant to the collar, and a return conduit within the supply conduit conveys the coolant away from the collar. In addition, the welding system includes a helical channel formed through the collar with an opening at one end to the supply conduit and at another end to the return conduit. The channel is designed to circulate coolant one or more times around the electrode.

In a further embodiment, a method of manufacturing a welding system includes disposing a supply conduit in a welding torch body for conveying coolant toward an electrode. The method also includes disposing a return conduit in the supply conduit, the return conduit being designed to convey coolant away from the electrode. In addition, the method includes forming a helical channel through a collar designed to hold the electrode in order to circulate coolant around the electrode. Finally, the method includes coupling the collar to a distal end of the torch body such that one end of the channel aligns with the supply conduit and another end of the channel aligns with the return conduit.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

As described in detail below, embodiments are provided of a tungsten inert gas (TIG) welding torch featuring improved liquid cooling. The welding torch includes a number of conduits for conveying coolant throughout a welding torch body, arranged to provide improved thermal insulation of the torch body and torch handle. That is, a supply conduit may convey coolant from a cooling system to a torch head at an end of the torch body and a return conduit disposed in the supply conduit may convey the coolant away from the torch head. When flowing between the supply conduit and the return conduit, coolant may travel through a cooling collar, circulating around the tungsten electrode held in the torch head. As the coolant circulates around the electrode, the coolant temperature may increase. However, the coolant flowing through the supply conduit may at least partially insulate the outer surface of the torch body and handle from the increased temperature of the coolant conveyed away from the torch head through the return conduit.

Figure 1:
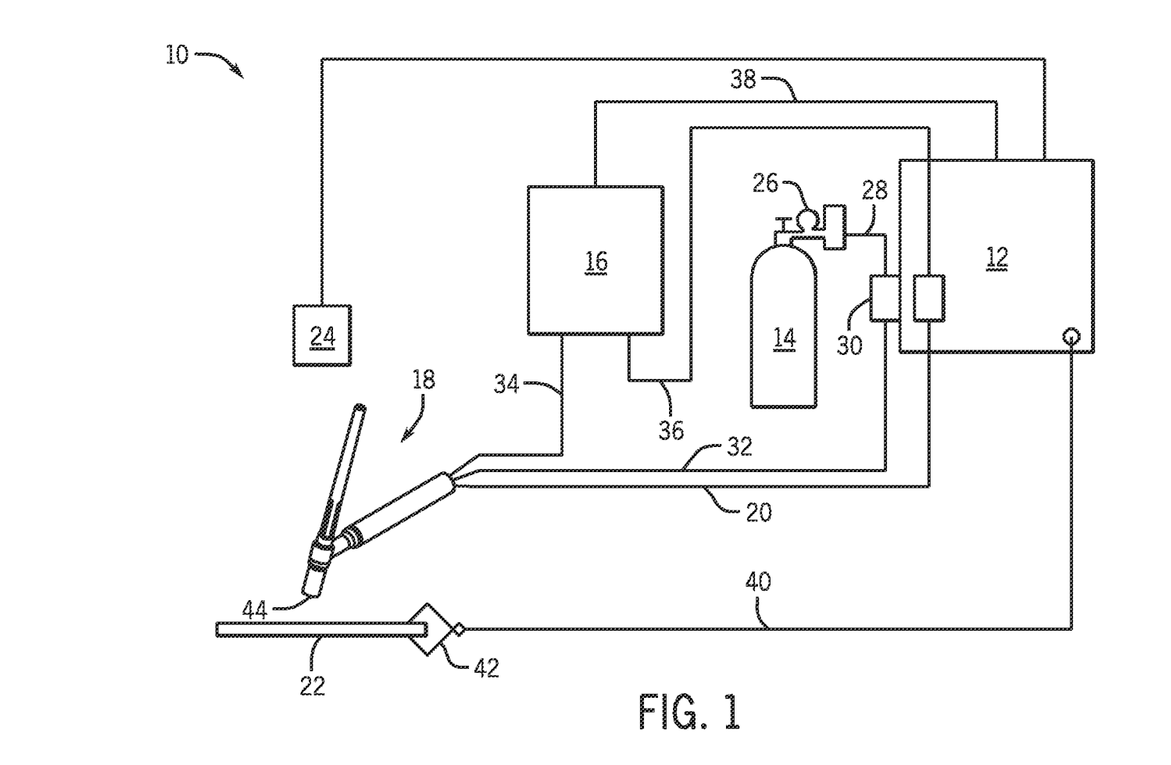
FIG. 1 is a schematic view of an exemplary welding system in accordance with embodiments of the present invention.

Turning now to the figures, FIG. 1 illustrates a tungsten inert gas (TIG) welding system 10 including a power source 12, a shielding gas source 14, a cooling system 16, and a torch 18. In the illustrated embodiment, the power source 12 provides power to the welding torch 18 via a power supply conduit 20. The power source 12 may supply a direct current (DC) or alternating current (AC) to the torch 18 depending on the desired application. For example, an AC current may be suited for welding aluminum or magnesium, and a DC current may be suited for welding stainless steels, nickel or titanium. In addition to matching the current to the material selection, the output of the power source 12 may be varied to obtain desired weld characteristics. For example, a low AC frequency (e.g., 56 Hz) current may generate a wide arc with shallow penetration of a work piece 22, while a high AC frequency (e.g., 200 Hz) current may generate a focused arc with deeper penetration into the work piece 22.

In addition to the frequency of the current, the power source 12 may vary the amperage of the current output to the torch 18. The setting for the amperage output by the power source 12 may be adjusted by a setting a knob or button on the power source 12, or may be set by a remote control 24. For example, a welding system 10 may include a foot pedal remote control 24 (as illustrated) that allows the operator to make current adjustments during welding by either holding down the foot pedal or feathering the foot pedal remote control 24 to vary the amperage. The remote control 24 may also include a finger tip control, audible command, or other form of input to signal the power source 12 to output a corresponding current.

In addition, the torch 18 may be supplied with a shielding gas from a supply 14. In general, the shielding gas may be supplied to the torch 18 and expelled from the torch at the location of the weld. The shielding gas may be expelled immediately prior to striking the welding arc, throughout welding, and/or until shortly after the welding arc is extinguished. The shielding gas protects the welding area from atmospheric gases such as nitrogen and oxygen, which can cause fusion defects, porosity, and weld metal embrittlement. The shielding gas may also transfer heat from the welding electrode to the metal and may help to start and maintain a stable arc.

As depicted in FIG. 1, the shielding gas may be provided in a container and delivered to the torch 18 via a regulator 26, a conduit 28, a gas valve 30, and a gas conduit 32. The regulator 26 may allow an operator to limit the pressure of the gas delivered to the gas valve 30 to obtain a desired flow rate. Further, the gas valve 30 may provide for stopping and starting the flow of the shielding gas to the torch 18 in coordination with other welding operations. Although shown mounted on the power source 12, the gas valve 30 may be located at other positions within the welding system 10, e.g., on the torch 18.

The TIG welding system 10 may be provided with a cooling system 16 to reduce heat build-up. The cooling system may take various forms including liquid cooled systems. The cooling system 16 may provide for circulation of the coolant via coolant supply hose 34, supply conduit 20, and coolant return hose 36. The cooling system may be powered from the power source 12 via a coolant system power cord 38.

In general, the welding system 10 may provide for current flow via a work piece 22 to the power source 12. For example, as depicted in FIG. 1, the welding system 10 may include a cable 40 that is secured to the work piece 22 via a work clamp 42. In this configuration, the current provided by the power source 12 flows through the supply conduit to the torch 18, flows across an arc from an electrode 44 to the work piece 22, and returns to the power source 12 via the work clamp 42 and the cable 40.

Figures 2, 3, 4:
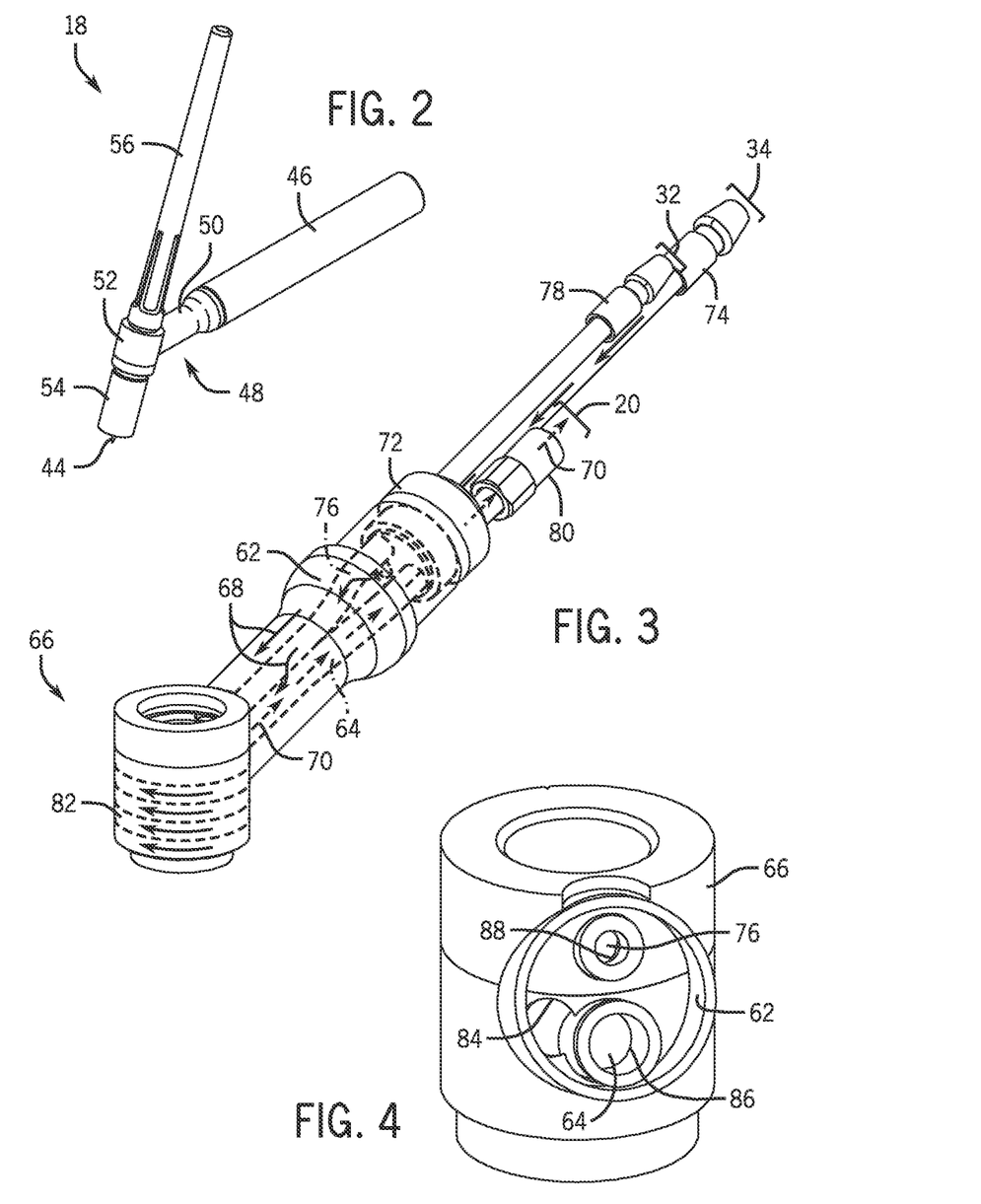
FIG. 2 is a perspective view of the tungsten inert gas (TIG) welding torch of FIG. 1.
FIG. 3 is a perspective view of certain components of a first embodiment of the TIG torch of FIG. 2 including certain transparent features to show the flow of coolant through the torch.
FIG. 4 is a perspective cutaway view of certain components of the TIG torch of FIG. 3.

FIG. 2 is a perspective view of the torch 18, including a torch handle 46 and a torch body 48. An operator may hold and manipulate the welding torch 18 and its components via the handle 46 that is attached to the torch body 48. The handle 46 may include a hollow interior to facilitate routing power, shielding gas, and coolant to the electrode 44. The torch body 48 may also include a torch neck 50 and a torch head 52.

Other components of the welding torch 18 that are coupled to the torch body 48 may include an insulator (not shown), a nozzle 54, a collet (not shown), the electrode 44, and a back cap 56. The insulator may be positioned on the interior of the torch body 48 to block heat produced by the welding current from passing into the torch body 48 and/or the handle 46. Embodiments of the present invention may feature a cooling collar located on the interior of the torch head 52 to function as this insulator by conveying coolant around the torch. The nozzle 54, which may be attached to the insulator or the torch head 52, may include a hollow tubular shaped piece that encloses the collet and the electrode 44, providing a path for the shielding gas to pass between an interior surface of the nozzle 54 and the collet. The back cap 56 screws into the torch head 52 to secure the collet and the electrode 44. Back caps 56 of different lengths and nozzles 54 of different sizes may be interchangeable with the same torch body 48, allowing an operator to use the same torch body for a variety of different TIG welding applications.

Certain components of the welding torch 18, including the liquid cooling system used to insulate the torch body 48 and the handle 46, are shown in FIG. 3. These components, located within the torch body 48 and the handle 46, may include, among other things, a coolant supply conduit 62, a coolant return conduit 64, and an annular cooling collar 66. The flow of coolant through the system is illustrated by arrows, solid arrows 68 representing coolant flowing toward and circulating within the cooling collar 66 and dashed arrows 70 representing coolant flowing away from the cooling collar 66. The supply conduit 62 may feature a relatively larger cross sectional area than the return conduit 64, and the return conduit 64 may be contained entirely within the supply conduit 62. This allows the relatively colder coolant entering the torch body 48 (indicated by solid arrows 68) to shield the outside surface of the torch body 48 from the relatively heated coolant exiting the torch body 48 (indicated by dashed arrows 70). That is, convective heat transfer may take place through the colder coolant between the return conduit 64, which contains the heated coolant, and an outer surface of the torch body 48 and/or handle 46. Accordingly, the torch body 48 (both the torch head 50 and the torch neck 52) and the handle 46 may be thermally insulated. Cooling the torch body 48 and handle 46 in this way may allow for the welding torch 18 to be operated at higher currents than possible with two separate conduits in the torch body.

In order to integrate the improved welding torch design with already existing welding systems, it may be desirable for the welding torch 18 to be compatible with current cooling systems 16. Accordingly, the welding torch 18 may include a manifold 72 designed to interface a supply hose connector 74 with the supply conduit 62. The supply hose connector 74 may couple with the supply hose 34 at one end to deliver coolant from the cooling system 16 to the supply conduit 62. The return conduit 64 may convey coolant to the power supply conduit 20, which also connects the power cable from the power source 12 to the torch 18. A gas conduit 76 may be located within the coolant supply conduit 62 as well, conveying shielding gas from the gas conduit 32 toward the torch head 52. A connector 78 may facilitate coupling of the gas conduits 32 and 76, while another connector 80 may facilitate coupling of the return conduit 64 with the supply conduit 20, connecting the power cable to the power source 12 and returning the coolant to the cooling system 16.

Between the supply conduit 62 and the return conduit 64, the coolant may travel through a channel 82 within the cooling collar 66. The channel 82 may be helical, allowing the coolant to circulate around the electrode 44 one or more times before returning the coolant to the cooling system 16 via the return conduit 64. By circulating coolant multiple times around the electrode 44, the channel 82 may allow cooling of a larger surface area of the inside surface of the torch head 52 than would be possible by circulating the coolant only once.

FIG. 4 shows a detailed cutaway view of the interface between the various conduits within the torch body 48 and the cooling collar 66. An aperture 84 in an outer surface of the cooling collar 66 permits the flow of coolant from the supply conduit 62 to the channel 82. Once the coolant has been circulated via the channel 82 in the cooling collar 66, the coolant may exit through another aperture 86 in the collar 66 leading to the return conduit 64. Thus, one aperture 84 allows coolant to enter the channel 82 while the other aperture 86 outputs the circulated coolant to the return conduit 64 disposed within the supply conduit 62. A third aperture 88 in the outer surface of the cooling collar 66 permits the gas conduit 76 to convey shielding gas to the collet held by the cooling collar 66. Other arrangements of the apertures and conduits through which coolant, gas, and electricity flow to the torch head 52 may be possible, as will be appreciated by those skilled in the art. For example, the aperture 84 through which coolant enters the cooling collar 66 may be located above the aperture 86 through which the coolant exits the cooling collar 66. This would allow the coolant to circulate from the top to the bottom of the cooling collar 66 of the welding torch 18. In addition, the return conduit 64 and gas conduit 76 may be arranged differently within the supply conduit 62. It should be noted that there may be space between an outer surface of the return conduit 64 and an inner surface of the supply conduit 62, allowing coolant to fully encompass the relatively higher temperature return conduit 64. This may facilitate convective heat loss through the coolant in the supply conduit 62, preventing excess heat from transferring to the outer surface of the torch body 48

Figure 5:
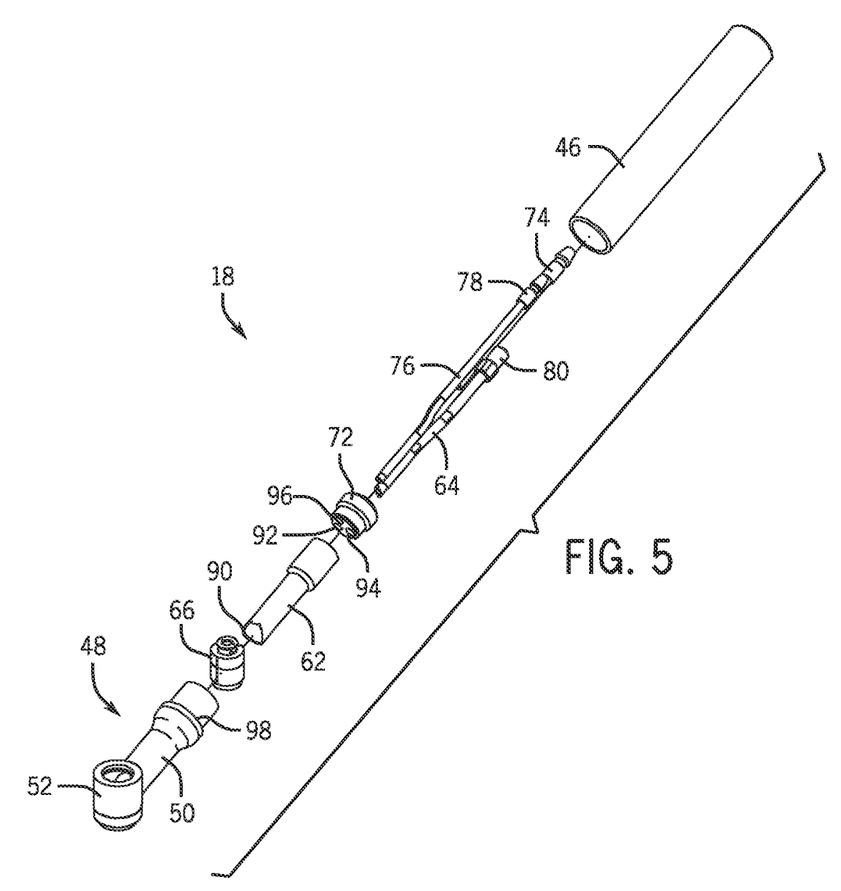
FIG. 5 is an exploded perspective view of certain components of the TIG torch of FIG. 3.

FIG. 5 is an exploded view of the welding torch embodiment of FIG. 3 including the torch body 48, handle 46, and components contained therein. The cooling collar 66, featuring the helical channel 82 for conveying coolant around the electrode 44, may fit into the torch head 52. The coolant supply conduit 62 may feature a curved end 90 contoured to abut the cooling collar 66, causing all coolant flowing in the supply conduit 62 to enter the channel 82 of the cooling collar 66 through the aperture 84 at the channel entrance. A return conduit 64 may then be disposed within the supply conduit 62 so that, when coolant is circulated through the welding torch 18, heat from the coolant flowing in the return conduit 64 may dissipate through the coolant flowing in the supply conduit 62. The gas conduit 76 may be disposed within the supply conduit 62 as well. The manifold 72 may be coupled with the supply conduit 62, allowing coolant to flow into the supply conduit 62 from the supply hose connection 74 through a channel 92 in the manifold 72. The manifold 72 may feature other channels 94 and 96 to accommodate the return conduit 64 and gas conduit 76, respectively. The supply conduit 62, return conduit 64, and gas conduit 76 may extend into the torch body 48 in order to convey coolant, gas, and electricity to the appropriate locations within the torch head 52. Finally, the handle 46 may be placed over the manifold 72 and the various conduits 62, 64, 74, and 76, then coupled with an attachment surface 98 on the torch neck 50. Finally, overmolding may be placed over the outer surface of the torch neck 50 and the handle 46, forming an additional layer of insulation for keeping the torch body 48 and the torch handle 46 relatively cool.

Figures 6, 7:
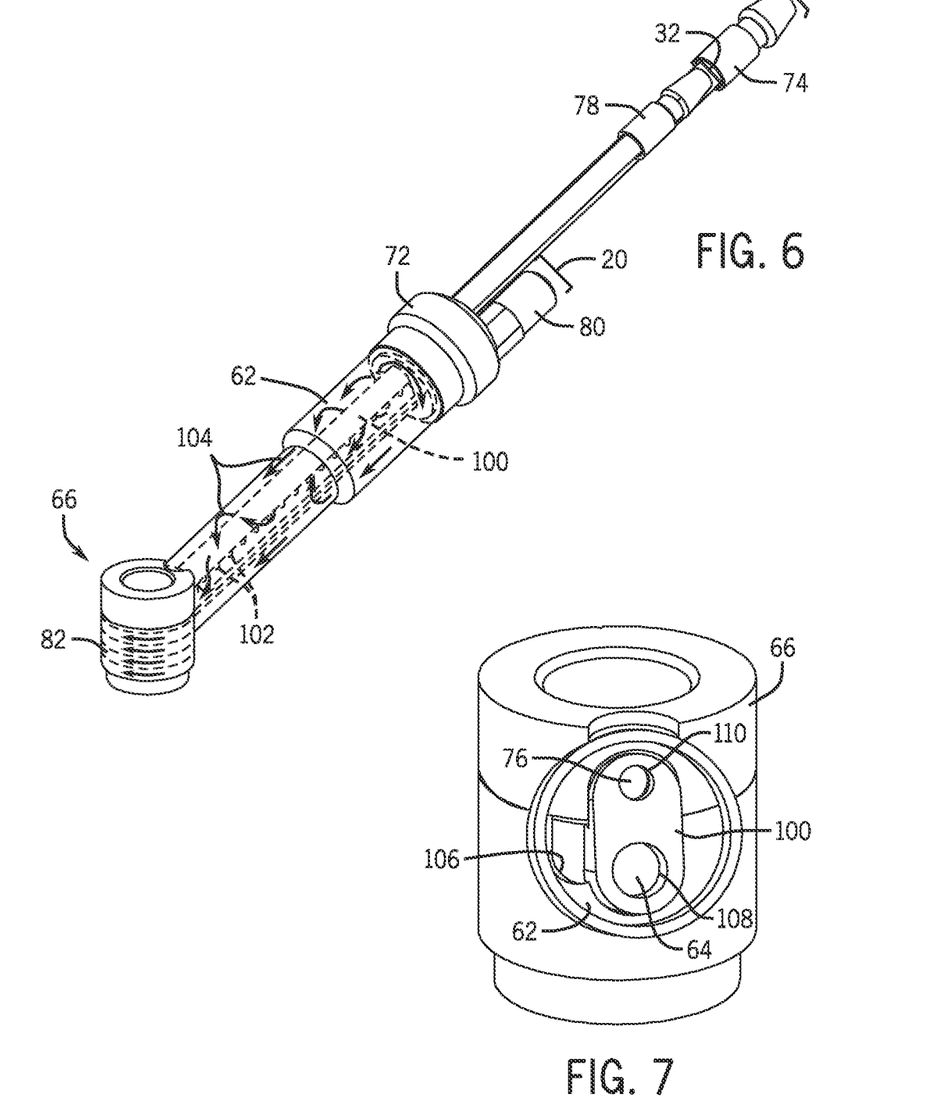
FIG. 6 is a perspective view of certain components of a second embodiment of the TIG torch of FIG. 2 with certain transparent features to show the flow of coolant through the torch.
FIG. 7 is a perspective cutaway view of certain components of the TIG torch of FIG. 6.

A perspective view of certain components of a second embodiment of the welding torch 18 is provided in FIG. 6. This embodiment features one multi-conduit structure 100 disposed within the supply conduit 62 and configured to supply shielding gas and power to the electrode 44 while conveying heated coolant away from the cooling collar 66. The gas, power, and coolant may be conveyed to their respective locations through channels in the integrated structure 100. Using the structure 100, instead of multiple pipe conduits, may make the welding torch 18 easier to manufacture and/or assemble. Apertures 102 may be formed through the structure 100, without intersecting the channels in the structure 100, to permit the flow of coolant around all edges of the channel conveying heated coolant away from the torch body 48. The flow of coolant through the supply conduit 62 and through the apertures 102 of the structure 100 is indicated by arrows 104.

As in the previous embodiment, a manifold 72 may facilitate the admittance of coolant into the supply conduit 62, shielding gas into the gas conduit 76, a power cable into the return conduit 64, and heated coolant out of the return conduit 64. The manifold 72 may allow the supply hose connector 74 and other connectors 78 and 80 to convey welding materials to and/or from the appropriate channels in the structure 100, even as the conduits may not align exactly with the connectors. FIG. 7 illustrates the interface between the cooling collar 66, the supply conduit 62, and the structure 100. As in the previous embodiment, the coolant may enter a helical channel 82 in the cooling collar 66 from the supply conduit 62 through an aperture 106 formed in the outer surface of the cooling collar 66. The coolant may pass from the cooling collar 66 to the return conduit 64 through an aperture 108 in the outer surface of the cooling collar 66. Likewise, the shielding gas may enter the torch head 52 from the gas conduit 76 through an aperture 110.

Figure 8:
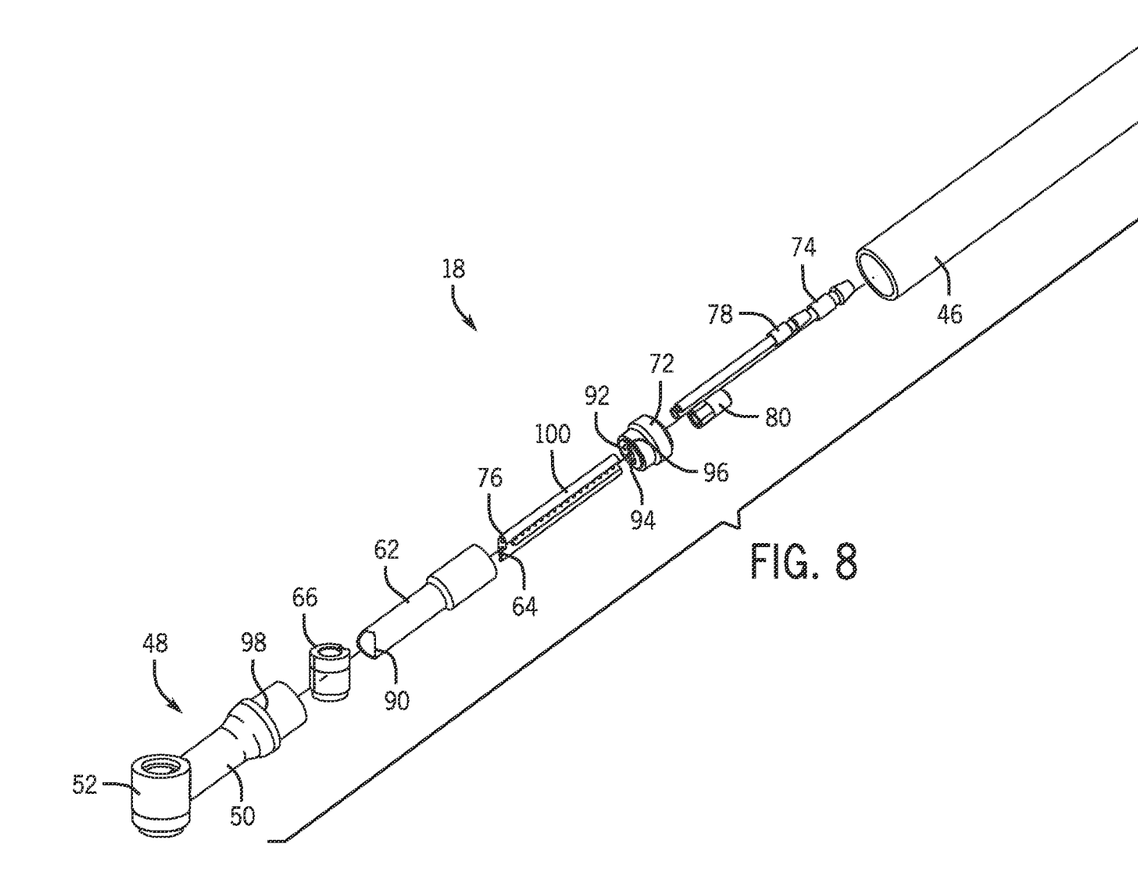
FIG. 8 is an exploded perspective view of certain components of the TIG torch handle of FIG. 6.

FIG. 8 is an exploded view of the second embodiment of the welding torch body 48, the handle 46, and components disposed therein. Assembly of this embodiment is similar to the assembly of the first embodiment, but instead of the return conduit 64 and the gas conduit 76 extending through the manifold 72, the structure 100 may couple with one side of the manifold 72 to convey gas, power, and returning coolant to or from the corresponding connectors 78, 80, and 74. In other aspects, the assembly of this embodiment is similar to that shown in FIG. 5. For example, the cooling collar 66 may be disposed in the torch head 52, and the supply conduit 62 is placed through the torch neck 50 and coupled with the cooling collar 66 via a contoured end 90. Then the structure 100 may be disposed within the supply conduit 62 and coupled with the cooling collar 66, to ensure that heat from the returning coolant may dissipate thoroughly in the surrounding supplied coolant. The manifold 72, as previously mentioned, connects the supply conduit 62 and the structure 100, which defines both the return conduit 64 and the gas conduit 76, to the appropriate connectors. Finally, the handle 46 may be placed over all the components extending from the torch body 48, and overmolding may cover the torch body 48 and the handle 46 to further thermally insulate the welding torch 18.

The welding torch 18 may reduce the overall temperature felt by an operator holding the welding torch 18 when running the welding system 10 at certain amperages. The channel 82 may allow coolant to circulate around the heated electrode 44 multiple times before returning to the cooling system 16, and the position of the return conduit 64 within the supply conduit 62 may provide convective cooling of the torch body 48 and handle 46. In addition, the temperature across the outer surface of the torch handle 46 may be more uniform than would be possible if the return conduit and supply conduit were placed in separate regions of the welding torch. The temperature of the welding torch 18 may still rise, but the temperature rise may be lessened and more evenly distributed across the torch surface. Decreasing the temperature rise through the torch body 48 and handle 46 may allow for the welding torch 18 to be operated at higher currents and, therefore, in a wider range of TIG welding applications.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A welding system comprising:
a welding torch body;
a collar coupled to the torch body and configured to hold an electrode;
a channel formed in the collar and configured to circulate coolant around the electrode;
a supply conduit disposed in the torch body and configured to convey coolant to the collar;
a gas conduit disposed in the supply conduit and configured to deliver shielding gas to the collar;
a return conduit disposed in the supply conduit and configured to convey heated coolant away from the collar, the coolant flowing through the supply conduit insulating the torch body from the heated coolant flowing through the return conduit; and
a structure disposed in the supply conduit, the structure having first and second channels formed therethrough, wherein the first channel comprises the return conduit and the second channel comprises the gas conduit.

2. The welding system of claim 1, comprising a manifold disposed at an end of the torch body distal the collar and configured to allow the coolant to flow from a supply hose extending from a coolant pump system to the supply conduit and from the return conduit to a retrieval hose leading to the coolant pump system.

3. The welding system of claim 1, comprising apertures formed through the structure and configured to permit movement of coolant throughout the supply conduit.

4. The welding system of claim 3, wherein the apertures are arranged in a row along a length of the structure and aligned perpendicular to the first and second channels through the structure in order to permit movement of the coolant between the first and second channels.

5. The welding system of claim 1, wherein the channel formed in the collar comprises a helical channel configured to circulate the coolant around the electrode multiple times.

6. The welding system of claim 1, wherein the channel formed in the collar comprises two ends, the first end coupled with an end of the supply conduit and the second end coupled with an end of the return conduit, allowing coolant to flow from the supply conduit to the channel and from the channel to the return conduit.

7. The welding system of claim 1, wherein the torch body comprises overmolding disposed around an outer surface of the torch body.

8. A welding system, comprising:
a welding torch body;
a collar coupled to the torch body and configured to hold an electrode;
a supply conduit disposed in the torch body and configured to convey coolant to the collar;
a gas conduit disposed in the supply conduit and configured to deliver shielding gas to the collar;
a return conduit disposed in the supply conduit and configured to convey coolant away from the collar;
a channel disposed in the collar having an opening at one end to the supply conduit and an opening at another end to the return conduit, the channel being configured to circulate coolant one or more times around the electrode; and
a structure disposed in the supply conduit, the structure having first and second channels formed therethrough, wherein the first channel comprises the return conduit and the second channel comprises the gas conduit.

9. The welding system of claim 8, comprising a manifold disposed at an end of the torch body distal the collar and configured to allow the coolant to flow from a supply hose extending from a coolant pump system to the supply conduit and from the return conduit to a retrieval hose leading to the coolant pump system.

10. The welding system of claim 8, comprising a power cable disposed in the return conduit and configured to deliver electric charge to the electrode.

11. A method of manufacturing a welding system, comprising:
disposing a supply conduit in a welding torch body, the supply conduit being configured to convey coolant toward an electrode;
disposing a gas conduit in the supply conduit, the gas conduit being configured to supply shielding gas to a collar configured to hold the electrode;
disposing a return conduit in the supply conduit, the return conduit being configured to convey coolant away from the electrode;
forming a channel in the collar, the channel being configured to circulate coolant around the electrode; and
coupling the collar to a distal end of the torch body, the supply conduit aligning with an entrance end of the channel and the return conduit aligning with an exit end of the channel.

12. The method of claim 11, comprising overmolding the torch body with a material configured to thermally insulate the torch body.

13. A welding system comprising:
a welding torch body;
a collar coupled to the torch body and configured to hold an electrode;
a channel formed in the collar and configured to circulate coolant around the electrode;
a supply conduit disposed in the torch body and configured to convey coolant to the collar;
a gas conduit disposed in the supply conduit and configured to deliver shielding gas to the collar, wherein the gas conduit comprises a first pipe running through the supply conduit; and
a return conduit disposed in the supply conduit and configured to convey heated coolant away from the collar, the coolant flowing through the supply conduit insulating the torch body from the heated coolant flowing through the return conduit, wherein the return conduit comprises a second pipe running through the supply conduit.

14. The welding system of claim 13, comprising a manifold disposed at an end of the torch body distal the collar and configured to allow the coolant to flow from a supply hose extending from a coolant pump system to the supply conduit and from the return conduit to a retrieval hose leading to the coolant pump system.

15. The welding system of claim 13, wherein the channel comprises a helical channel configured to circulate the coolant around the electrode multiple times.

16. The welding system of claim 13, wherein the channel comprises two ends, the first end coupled with an end of the supply conduit and the second end coupled with an end of the return conduit, allowing coolant to flow from the supply conduit to the channel and from the channel to the return conduit.

17. The welding system of claim 13, wherein the torch body comprises overmolding disposed around an outer surface of the torch body.

18. A welding system, comprising:
   a welding torch body;
   a collar coupled to the torch body and configured to hold an electrode;
   a supply conduit disposed in the torch body and configured to convey coolant to the collar;
   a gas conduit disposed in the supply conduit and configured to deliver shielding gas to the collar, wherein the gas conduit comprises a first pipe running through the supply conduit;
   a return conduit disposed in the supply conduit and configured to convey coolant away from the collar, wherein the return conduit comprises a second pipe running through the supply conduit; and
   a channel disposed in the collar having an opening at one end to the supply conduit and an opening at another end to the return conduit, the channel being configured to circulate coolant one or more times around the electrode.

19. The welding system of claim 18, comprising a manifold disposed at an end of the torch body distal the collar and configured to allow the coolant to flow from a supply hose extending from a coolant pump system to the supply conduit and from the return conduit to a retrieval hose leading to the coolant pump system.

20. The welding system of claim 18, comprising a power cable disposed in the return conduit and configured to deliver electric charge to the electrode.

* * * * *